United States Patent

Kusunoki et al.

(10) Patent No.: US 9,831,963 B2
(45) Date of Patent: Nov. 28, 2017

(54) MIMO COMMUNICATION METHOD, TERMINAL, AND BASE STATION APPARATUS FOR TRANSMITTING AND RECEIVING PILOT SIGNALS TO ESTIMATE A CHANNEL

(71) Applicant: SONY CORPORATION, Tokyo (JP)

(72) Inventors: Shigeo Kusunoki, Kanagawa (JP); Erik Bengtsson, Lund (SE); Ying Zhinong, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 249 days.

(21) Appl. No.: 14/714,487

(22) Filed: May 18, 2015

(65) Prior Publication Data

US 2015/0358092 A1 Dec. 10, 2015

Related U.S. Application Data

(60) Provisional application No. 62/008,898, filed on Jun. 6, 2014.

(51) Int. Cl.
*H04B 17/309* (2015.01)
*H04L 5/00* (2006.01)
(Continued)

(52) U.S. Cl.
CPC ......... *H04B 17/309* (2015.01); *H04B 7/0413* (2013.01); *H04J 13/004* (2013.01);
(Continued)

(58) Field of Classification Search
CPC . H04L 27/2464; H04L 5/0051; H04L 5/0048; H04L 5/007; H04B 17/309; H04W 24/02
See application file for complete search history.

(56) References Cited

U.S. PATENT DOCUMENTS

2007/0133659 A1* 6/2007 Deng .................... H04L 1/0625
375/144
2007/0218843 A1* 9/2007 Mizusawa ............. H04L 1/0028
455/69

(Continued)

OTHER PUBLICATIONS

Marzetta, "Noncooperative Cellular Wireless with Unlimited Numbers of Base Station Antennas," IEE Transactions on Wireless Communications, vol. 9, No. 11, Nov. 2012; pp. 3590-3600.

(Continued)

*Primary Examiner* — Ian N Moore
*Assistant Examiner* — Mewale Ambaye
(74) *Attorney, Agent, or Firm* — Oblon, McClelland, Maier & Neustadt, L.L.P.

(57) ABSTRACT

A MIMO communication method of performing MIMO communication between a base station having a plurality of antennas and each of a plurality of terminals covered by the base station using uplink data slots and downlink data slots that are alternately placed on a time axis. The method includes, in the base station, despreading a received signal that is transmitted from each of the plurality of terminals demodulating the transmission data transmitted from a respective terminal on the basis of the value of the estimated channel; decoding a received signal included in the uplink data slots, estimating a current channel between each of all antennas of the base station and the respective terminal; and comparing the stored value of the estimated channel with a value of the estimated current channel and updating the stored value of the estimated channel to the value of the estimated current channel.

8 Claims, 10 Drawing Sheets

(51) Int. Cl.
    *H04L 27/26*     (2006.01)
    *H04W 24/02*     (2009.01)
    *H04B 7/0413*     (2017.01)
    *H04J 13/00*     (2011.01)

(52) U.S. Cl.
    CPC ........ *H04L 5/0051* (2013.01); *H04L 27/2646* (2013.01); *H04W 24/02* (2013.01)

(56) References Cited

U.S. PATENT DOCUMENTS

| | | | | |
|---|---|---|---|---|
| 2008/0232325 | A1* | 9/2008 | Mehta | H04B 7/061 370/332 |
| 2011/0002293 | A1* | 1/2011 | Yuk | H04W 72/0406 370/329 |
| 2011/0235533 | A1* | 9/2011 | Breit | H04B 7/0452 370/252 |
| 2014/0056331 | A1 | 2/2014 | Nair et al. | |
| 2014/0126385 | A1* | 5/2014 | Azizi | H04L 5/0048 370/252 |

OTHER PUBLICATIONS

Rusek et al., "Scaling Up Mimo," IEEE Signal Processing Magazine, Jan. 2013, pp. 40-60.

Extended European Search Report dated Nov. 2, 2015 in Patent Application No. 15169913.9.

* cited by examiner

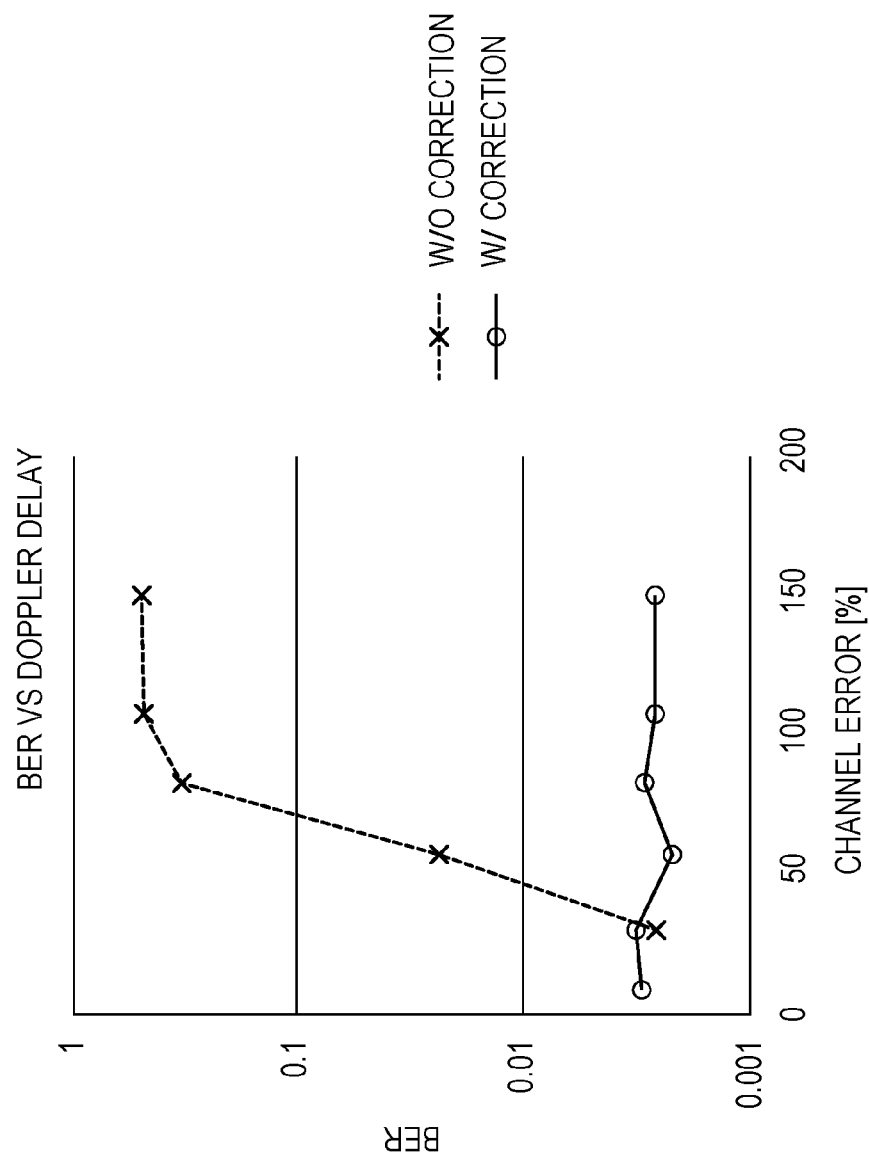

MIMO COMMUNICATION METHOD, TERMINAL, AND BASE STATION APPARATUS FOR TRANSMITTING AND RECEIVING PILOT SIGNALS TO ESTIMATE A CHANNEL

CROSS REFERENCE TO RELATED APPLICATIONS

This application is related to and claims priority under 35 U.S.C. §119(e) to Provisional Application Ser. No. 62/008,898, filed Jun. 6, 2014, the contents of which are hereby incorporated herein by reference.

BACKGROUND

1. Field

The present disclosure relates to MIMO (Multiple-Input, Multiple-Output) communication methods, and, more particularly, to a MIMO communication method of transmitting and receiving a pilot signal.

2. Description of the Related Art

In current years, with the widespread use of smartphones, the amount of wireless communication performed by mobile terminals has explosively increased. It is expected that communication between devices without human intervention will be performed in the future. From 2020 onward, a traffic volume is likely to increase by a factor of 1000 to 10000. Therefore, a new communication system is actively being studied. That is, in addition to LTE and LTE-A that have already been commercially practical, a system with which higher frequency utilization efficiency is achieved is being studied and is expected to be proposed as the fifth generation system of the 3rd Generation Partnership Project (3GPP).

Massive MIMO is one of effective technologies.

As illustrated in FIG. 10, in a communication system, a base station BS has many (Nb) transmission antennas (Ant#1 to Ant#Nb) and communicates with a plurality of (N) terminals (pieces of User Equipment: UE#1 to UE#N) at the same time via channels h00 to h0(N-1) to channels h(Nb-1)0 to h(Nb-1)(N-1). The number of transmission antennas (Nb) in the base station BS is, for example, approximately 100, and the number of terminals is, for example, approximately 10.

With this structure, frequency utilization efficiency that has been affected by communication path noise and rapidly changing fading can be stably obtained almost without such effects. As compared with MIMO in the related art, a communication path capacity markedly increases. From these reasons, the massive MIMO is the most promising next-generation technology.

The massive MIMO system was introduced in a paper around 2010 and has been studied for its practical use. The results of the study have been actively reported since the middle of 2013. Detailed examples of the results of the study are, for example, Non-Patent Literatures 1 and 2. Referring to these literatures, the most important part of the study is channel estimation that is performed with pilot signals. For example, when the number of antennas of a base station is 100 and the number of terminals (each having one antenna) is 10, MIMO channels become a 10×100 matrix. This state is quite different from that in a MIMO system in the related art. More accurate channel estimation is required.

In a massive MIMO data section, terminals simultaneously perform transmission operations that overlap one another. The transmitted signals are received by many receiving antennas of the base station BS. The autocorrelation of the received signals is performed for channel diagonalization. The channel diagonalization allows the terminals to be distinguished one another. When the channel diagonalization is incompletely performed, interference among the terminals occurs and communication fails. For accurate diagonalization, more accurate channel estimation is required.

A channel estimation method that is currently the mainstream is performed with pilots that are transmitted from terminals and received by a base station. In this method, in order to avoid interference among the pilots transmitted from the terminals, it is assumed that the pilots are transmitted in slots that do not overlap on a time-frequency axis.

This method will be described with reference to FIG. 9. In the present disclosure, as a method of distinguishing between an uplink (transmission from a terminal to a base station, Up Link: UL) and a downlink (transmission from the base station to the terminal, Down Link: DL), time division duplex (TDD) is employed. In the TDD method, the uplink and the downlink are alternately arranged on a time axis so as to prevent a situation in which different channels are used for the uplink and the down link and to flexibly adapt to the change of a traffic volume. For the simplification of the drawing, eight terminals are illustrated in FIG. 9.

A signal stream includes headers preceding data slots both in uplink and downlink. When pilot signals reach a base station, a delay occurs because of multipath. Assuming that the maximum delay time is Tg, the number of pilots that do not mutually interfere with one another in a single TDD slot Ts is Ts/Tg. Referring to FIG. 9, four pilots are included in a single TDD slot Ts. Since all pilots for eight terminals cannot be included in this state, the transmission of pilots is also performed with the next TDD slot. While a certain terminal transmits a pilot, the other terminals cannot perform transmission. In the drawing, this term is illustrated as NA (Not Available). Thus, a pilot period increases a total overhead and degrades frequency utilization efficiency and throughput.

A result of a single channel estimation is maintained on condition that a terminal is not moved. However, when the terminal moves and a channel variation occurs, diagonalization cannot be performed. Accordingly, it is necessary to perform channel update at regular time intervals. This time interval is referred to as coherence time. The base station BS needs to have more accurate channel information at all times. It is therefore desirable that the base station BS perform channel update in the shortest possible time. On the other hand, however, the channel update performed on a terminal that is not being moved causes an increase in overhead.

Furthermore, many control signals are transmitted between the base station BS and the user equipment UE. Since the transmission of these control signals is also performed with headers, when headers are occupied with pilots and control signals, overhead may increase and a total throughput may decrease.

CITATION LIST

Non Patent Literature

[NPL 1] Thomas L. Marzetta, "Noncooperative Cellular Wireless with Unlimited Numbers of Base Station Antennas", IEEE TRANSACTIONS ON WIRELESS COMMUNICATIONS, VOL. 9, NO. 11, NOVEMBER 2010, pp. 3590-3600

[NPL 2] Fredrik Rusek, Daniel Persson, Buon Kiong Lau, Erik G. Larsson, Thomas L. Marzetta, Ove Edfors, and Fredrik Tufvesson, "Scaling up MIMO", IEEE SIGNAL PROCESSING MAGAZINE, January 2013, pp. 40-60

In the case of the method in the related art, in addition to the above-described problem that is the increase in overhead, another problem is present. The problem is that a certain base station detects a pilot transmitted from a neighboring cell to a cell of the base station, and is referred to as pilot contamination.

In the method in the related art, for different cells, the same pilot transmission slot and the same kind of pilot signal are used so as to set a repetition rate to "1". This leads to the increase in frequency utilization efficiency. When pilot contamination occurs, that is, a base station receives a pilot from a terminal in another cell, the base station misidentifies the terminal as if the terminal was in a cell of the base station. As a result, the terminal is accessed by a plurality of base stations and interference occurs.

Furthermore, in massive MIMO, when a plurality of terminals are in close proximity to each other, it is difficult to perform the separation between channels for the terminals. In this case, even if channel correlation is performed, the separation between signals cannot be achieved and communication fails.

An inventor recognizes the need for a pilot signal communication method suitable for massive MIMO.

BRIEF SUMMARY

According to the present disclosure, there is provided a MIMO communication method of performing MIMO communication between a base station having a plurality of antennas and each of a plurality of terminals covered by the base station using uplink data slots and downlink data slots that are alternately placed on a time axis. The MIMO communication method includes: in each of the plurality of terminals, setting pilot transmission headers to be used for transmission of a pilot signal at predetermined header intervals as headers of the uplink data slots; spreading the pilot signal in the pilot transmission headers using corresponding one of orthogonal codes that are assigned to the plurality of terminals and are orthogonal to one another and transmitting the spread pilot signal; spreading the pilot signal in the uplink data slots using a data orthogonal code that is different from the orthogonal code used in the pilot transmission headers, superimposing the spread pilot signal on transmission data, and transmitting the transmission data; in the base station, despreading a received signal that is transmitted from each of the plurality of terminals and is included in the pilot transmission headers using the orthogonal code assigned to the terminal, estimating a channel between each of all antennas of the base station and the terminal, and storing a value of the estimated channel; demodulating the transmission data transmitted from the terminal on the basis of the value of the estimated channel; decoding a received signal included in the uplink data slots using the data orthogonal code assigned to the terminal and estimating a current channel between each of all antennas of the base station and the terminal; and comparing the stored value of the estimated channel with a value of the estimated current channel and updating the stored value of the estimated channel to the value of the estimated current channel when a difference between the values is larger than a value set in advance.

Since pilot transmission headers are placed at predetermined header intervals, headers can be prevented from being occupied with pilots, a header load is reduced, and the decrease in total throughput can be prevented.

Since a pilot signal is spread in uplink data slots using an orthogonal code that is different from a code used in pilot transmission headers, is superimposed on transmission data, and is transmitted, a base station can perform channel estimation at the time of data reception and can always obtain the latest channel information.

Using orthogonal codes, signals from terminals in close vicinity of one another can be separated. Furthermore, since signals from the other cells can be separated, pilot contamination can be solved. In the present disclosure, since a long-period orthogonal code can be used for the superimposition of a pilot signal on data in data slots, a code shortage does not occur.

BRIEF DESCRIPTION OF THE DRAWINGS

FIG. 6 is a graph illustrating a result of characteristic simulation according to an embodiment of the present disclosure.

DETAILED DESCRIPTION

The first embodiment of the present disclosure will be described in detail below.

Figure 1:
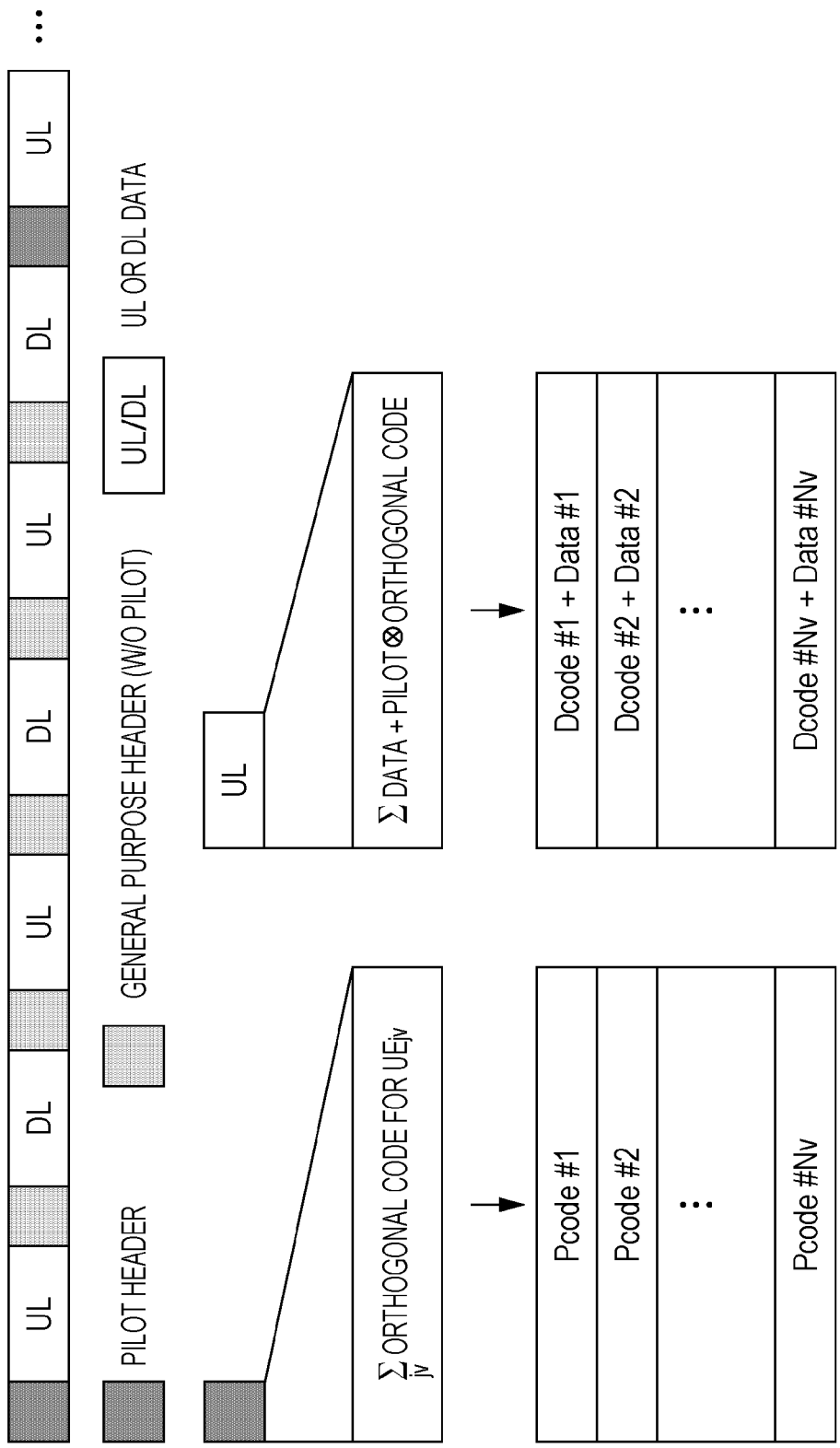
FIG. 1 is a diagram illustrating the time slot configuration of a signal stream transmitted/received from/by a base station in massive MIMO according to a first embodiment of the present disclosure.

FIG. 1 is a diagram illustrating the time slot configuration of a signal stream transmitted/received from/by a base station in massive MIMO according to an embodiment of the present disclosure.

In this embodiment, a single base station covers Nv mobile terminals (UE#1 to UE#Nv). In the following description, a mobile terminal is merely referred to as a terminal. The distance between each terminal and a base station is measured in advance and a transmission time at the terminal is adjusted in accordance with the distance, so that signals transmitted from the terminals can be synchronized at a receiving point. This method is used for Long Term Evolution (LTE). In a signal stream, uplinks (ULs) and downlinks (DLs) are time-separated through time division duplex (TDD). The same frequency is used for the ULs and the same frequency is used for the DLs.

A header is set so that it precedes each of the uplinks and the downlinks. There are two types of UL headers, a first UL header and a second UL header. The first UL header is a header dedicated to pilot transmission (pilot header). The pilot headers are not all UL headers and are dispersedly located at regular intervals in a stream. The second UL header is a general-purpose header used for the other purposes. All of DL headers are general-purpose headers.

In this embodiment, a pilot signal of "1" is used. Pilot orthogonal codes Pcode#1 to Pcode#Nv are assigned to a plurality of pieces of user equipment. Each piece of user equipment spreads the pilot signal of "1" using the assigned orthogonal code and transmits the spread pilot signal using a pilot header. The "spread" means that exclusive OR processing is performed with a pilot signal and an orthogonal code.

The base station BS receives pilots from all pieces of user equipment at the same time, and can distinguish among these pieces of user equipment by performing despreading using the orthogonal codes. The "despread" means that exclusive OR processing is performed with a received signal and the orthogonal code and then addition processing is performed over an overall code length. This process is equivalent to the inner product of vectors.

By using the pilot orthogonal code for the pilot signal received from the piece of user equipment, a channel H0 between each of all antennas of the base station BS and the piece of user equipment can be estimated.

Subsequently, each piece of user equipment transmits data using a UL data slot. At that time, a pilot is spread with one of data orthogonal codes Dcode#1 to Dcode#Nv that are different from the orthogonal code for the pilot described above. A result of the spreading is multiplied by an amplitude adjustment factor Pg and is then multiplexed (superimposed) on data. That is, the piece of user equipment transmits data Tx_data obtained from the following equation (1) as data for a user equipment number jv.

$$Tx\_data = data + Pg \cdot Dcode\#jv \cdot Pilot \quad (1)$$

The addition of the first term and the second term on the right side of equation (1) is performed for each bit. That is, the length of the data orthogonal code Dcode is in agreement with the total data length. As is apparent from equation (1), while a pilot signal is spread with an orthogonal code, data is merely superimposed.

The base station BS receives a signal Rx_data represented by the following equation (2).

$$Rx\_data = H0r \cdot Tx \quad (2)$$
$$= H0r \cdot (data + Pg \cdot Dcode\#jv \cdot Pilot)$$

In this equation, H0r represents a channel. The channel H0r may be changed from the initial channel H0 obtained from the pilot header.

The base station performs despreading on the received signal Rx_data using the data orthogonal code assigned to the piece of user equipment so as to obtain a channel-related receiving signal. This process is represented by the following equation (3).

$$Channel\text{-}related\ receiving\ signal = Rx\_data(x)$$
$$Dcode\#jv^T = H0r \cdot (data + Pg \cdot Dcode\#jv \cdot Pilot)(x)$$
$$Dcode\#jv^T \quad (3)$$

In this equation, an index T represents transposition and (x) represents a vector inner product operation (despreading). In equation (3), since data is random and its autocorrelation is low, the inner product of the data and the long-period code Dcode is substantially zero. Consequently, when the length of the data orthogonal code Dcode is LN, equation (3) becomes the following equation.

$$Channel\text{-}related\ receiving\ signal = H0r \cdot Pg \cdot LN \cdot Pilot \quad (4)$$

From equation (4), the channel H0r is obtained by Channel-related receiving signal/(Pg·LN·Pilot).

Demodulated data is obtained from the following equation.

$$(Rx\_data/H0r) - \Sigma_{jv} Pg \cdot Dcode\#jv \quad (5)$$

In equation (5), the second term of ($\Sigma_{jv}$Pg·Dcode#jv) is known and its value is prepared in advance.

As is apparent from the following equation (6), the demodulated data can be obtained by multiplying equation (5) by H0*. This multiplication is performed for correlation.

$$\{(data + Pg \cdot Dcode\#jv \cdot Pilot) - \Sigma_{jv} Pg \cdot Dcode\#jv\} \times H0^* \quad (6)$$

where "*" of H0* represents a complex conjugate transpose.

Next, operations will be described.

When a piece of user equipment is placed under the control of a base station (is present in a corresponding cell) and is powered on, a registration request is issued and initial setting is performed. At that time, the base station assigns two types of orthogonal codes, the pilot orthogonal code and the data orthogonal code, to this piece of user equipment.

Each piece of user equipment spreads a pilot signal in a slot for a pilot header using an assigned pilot orthogonal code and transmits the spread pilot signal. At the time of data transmission, each piece of user equipment multiplexes (superimposes) a data pilot on data and transmits the data.

The base station first receives the pilot header and estimates the channel H0 between each of all antennas of the base station and the piece of user equipment using the pilot orthogonal code assigned to the piece of user equipment. The channel H0 is stored in the base station. Subsequently, the base station receives from the piece of user equipment data on which a data pilot has been superimposed.

Figure 2:
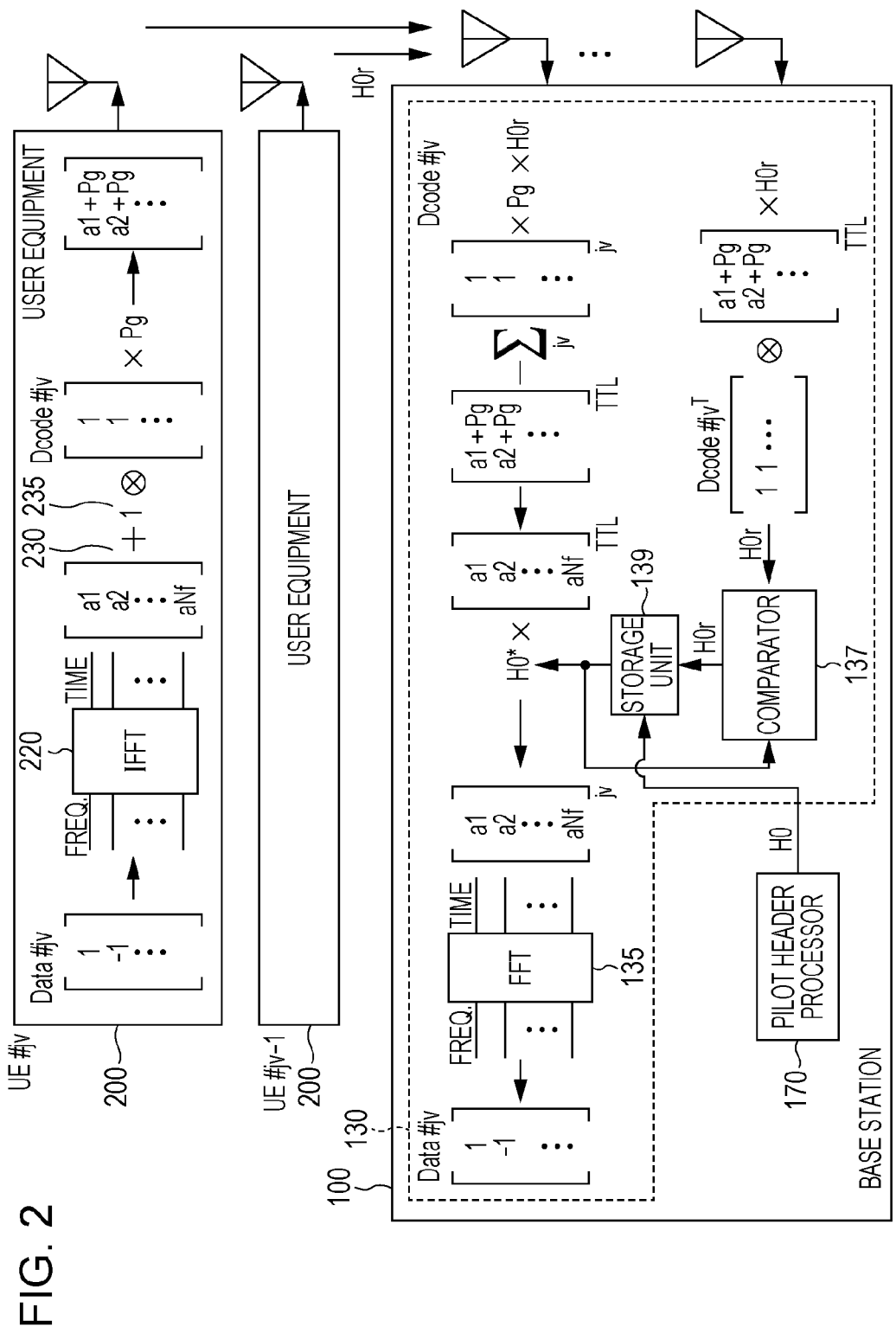
FIG. 2 is a diagram illustrating the configuration of a transmission unit in user equipment and the configurations of units for performing receiving processing and data processing in a base station according to the first embodiment.

FIG. 2 is a diagram illustrating the configuration of a transmission unit in user equipment 200 and the configurations of units for performing receiving processing and data processing in a base station 100. This drawing illustrates a case where an Orthogonal Frequency Division Multiplexing (OFDM) system is used.

In a certain piece of terminal 200 (UE#jv), transmission data Data#jv is subjected to inverse fast Fourier transform in an inverse fast Fourier transformer (IFFT) 220 and is converted into a time-domain transmission signals (a1, a2, . . . and, aNf). Subsequently, to the obtained time-domain transmission signals (a1, a2, . . . and, aNf) output from the IFFT 220, a result of the product of an amplitude adjustment factor Pg and a pilot (a pilot of "1" in this example) 235 spread using an orthogonal code Dcode#jv is added for each bit (230). A resultant signal is subjected to high-frequency processing and is transmitted via an antenna. The description of known processing operations such as the addition of a cyclic prefix, digital-to-analog (D/A) conversion, high-frequency conversion, and amplification is omitted.

The base station 100 receives signals from a plurality of pieces of user equipment 200 at a time via a plurality of antennas under the effect of the channel H0r. The description of known configurations of a Radio Frequency (RF) unit, a quadrature modulation unit, and an analog-to-digital conversion unit will be omitted.

A pilot header processor 170 in the base station 100 receives a pilot header and performs despreading of the received signal using a pilot orthogonal code assigned to a corresponding piece of user equipment, thereby distinguishing the piece of user equipment from the other pieces of user equipment and estimating the channel H0 between each of all antennas of the base station and the piece of user equipment. The channel H0 is stored in a storage unit 139 in the base station 100.

As described previously, the channel H0r indicates that it may be changed from the channel H0 at the time of reception of a pilot header. Subsequently, a data processor 130 performs data decoding processing and channel estimation processing for each piece of user equipment. In the drawing, an index "TTL" is an abbreviation for total and represents the combination of all pieces of user equipment.

In data decoding processing that corresponds to equations (5) and (6) and is illustrated in the upper portion of the block of the base station 100 in FIG. 2, first, the data orthogonal code component of all pieces of user equipment is subtracted from the received signal. The data orthogonal code component of all pieces of user equipment is obtained by multiplying the amplitude adjustment factor Pg.

Subsequently, in order to correlate a result of the subtraction and the complex conjugate transpose H0* of the channel matrix H0 stored in the storage unit 139, the subtraction result is subjected to multiplication. As a result, received signals are separated on a terminal-by-terminal basis in accordance with the characteristic of MIMO communication. Subsequently, a fast Fourier transformer (FFT) 135 performs an FFT operation on the obtained signal, so that original transmission data can be acquired (decoded).

In channel estimation processing illustrated in the lower portion of the data processor 130 in the base station 100 in FIG. 2, each of signals received from all pieces of user equipment is despread using the code Dcode#jv of a corresponding one of these pieces of user equipment. Using the above-described equations (3) and (4), the channel H0r is estimated. Subsequently, a comparator 137 compares the obtained channel H0r with the channel H0 stored in the storage unit 139. When the difference between the estimated values of the channels H0r and H0 is equal to or larger than a certain value, the channel H0 stored in the storage unit 139 is updated to the channel H0r. The estimation of the channel H0, which is performed by the pilot header processor 170 using a pilot header, may be performed at the time of the above-described initial setting and the restart of communication. During communication, the update of a channel estimation value is performed using a pilot superimposed on a data slot. The channel estimation performed with a pilot header is not performed or a result of the channel estimation is eliminated after performance of the channel estimation.

Next, exemplary specific numerical values of main parameters will be described. Both time lengths of a massive MIMO uplink slot and a massive MIMO downlink slot under consideration are 500 µS. The time length of a header has not been set yet. Accordingly, an LTE time standard is employed. The reason for this is that the fifth generation (5G) system will be probably compliant with the fourth generation (4G) system. In this case, the TDD-LTE standard of 1 slot=500 µS can be employed. Since seven OFDM symbols are transmitted, a time length of a single OFDM symbol becomes approximately 70 µS. When this time length is used for a header, approximately 32 nS is obtained per OFDM bin (FFT symbol). Accordingly, in a case where one bit is assigned to one bin, a pilot orthogonal code having the length of 2048 bits can be prepared. This means that 2048 pieces of user equipment can be distinguished. Massive MIMO under consideration estimates the number of pieces of user equipment covered by a single base station at 10 to 20. Accordingly, this code numerical value is sufficiently large.

The data length of a data orthogonal code is 2048×7 since seven OFDM symbols are included in a single slot. An orthogonal code having this length can be used. Some methods of using the orthogonal code can be proposed, and will be described below as first and second modifications.

Figure 3:
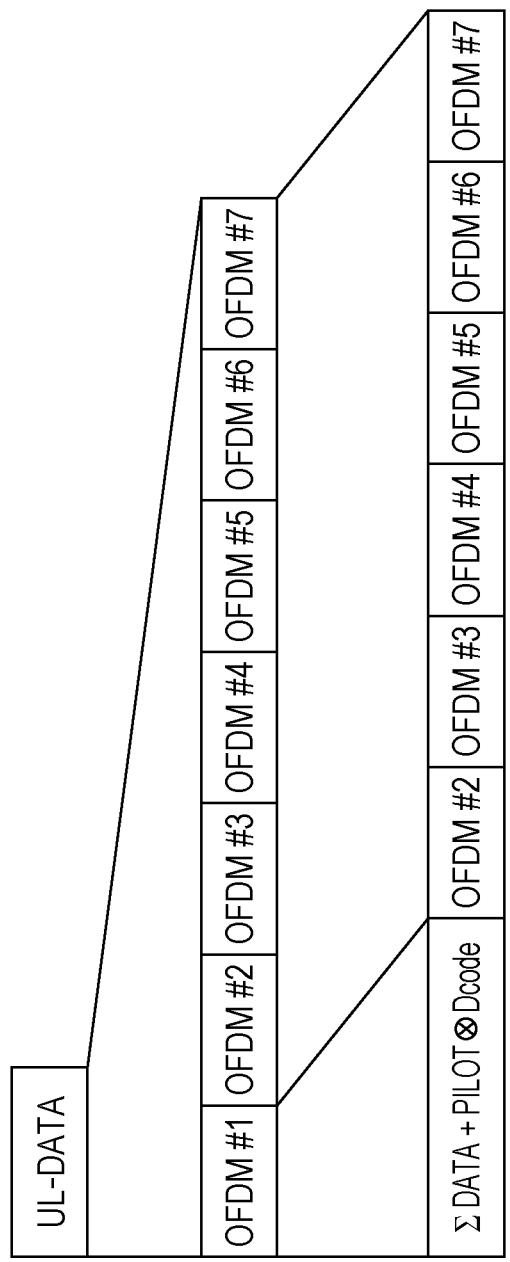
FIG. 3 is a diagram illustrating a first modification of the first embodiment.

In the first modification in FIG. 3, an exemplary case where seven OFDM symbols are included in an uplink data slot UL-data and a pilot is superimposed on only one symbol is illustrated. The other OFDM symbols are used only for data transmission. In the exemplary case in FIG. 3, although a pilot is superimposed on a first OFDM symbol OFDM#1, a pilot may be superimposed on another symbol. Alternatively, pilots may be superimposed on a plurality of OFDM symbols. The length of a single slot is 500 µS. Accordingly, when it can be assumed that there is no channel variation in this period, a system can be simplified. Thus, an uplink data slot can be separated into a plurality of data sections and a pilot can be superimposed on at least one data section.

Figure 4:
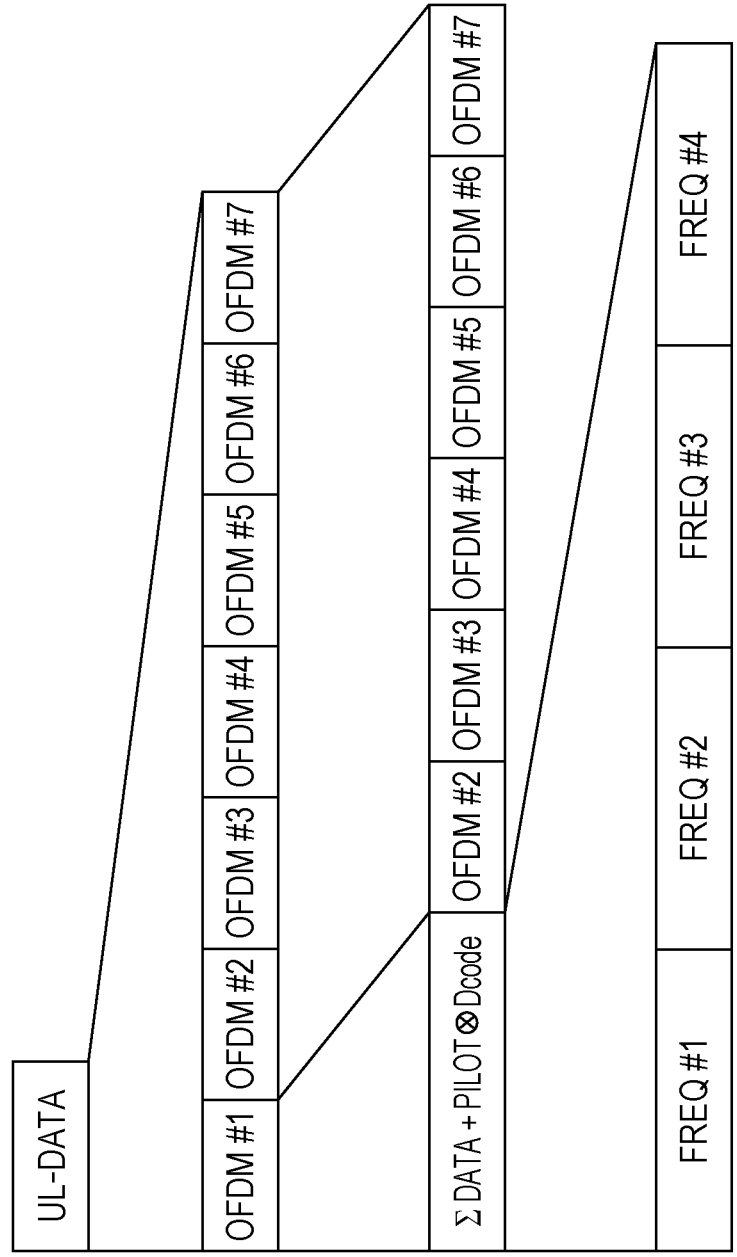
FIG. 4 is a diagram illustrating a second modification of the first embodiment.

The second modification illustrated in FIG. 4 differs from the exemplary case illustrated in FIG. 3 in that an OFDM frequency component is separated into a plurality of blocks (four blocks in the drawing) and pilots are superimposed on these blocks. The same orthogonal code is assigned to these blocks. In an exemplary case in FIG. 4, an orthogonal code having the length of 512 is assigned to each block. Under the assumption that frequency fading occurs, channel estimation can be performed for each block when there is a frequency characteristic. Thus, a pilot can be superimposed on each of a plurality of blocks into which a frequency component in an OFDM symbol is separated.

In the embodiment in FIG. 1, exemplary pilot superimposition processing in a time domain is illustrated. When OFDM is employed, frequency domain processing can be performed. In this case, since a channel is obtained for each OFDM subcarrier, more detailed frequency characteristic can be covered.

Figure 5:
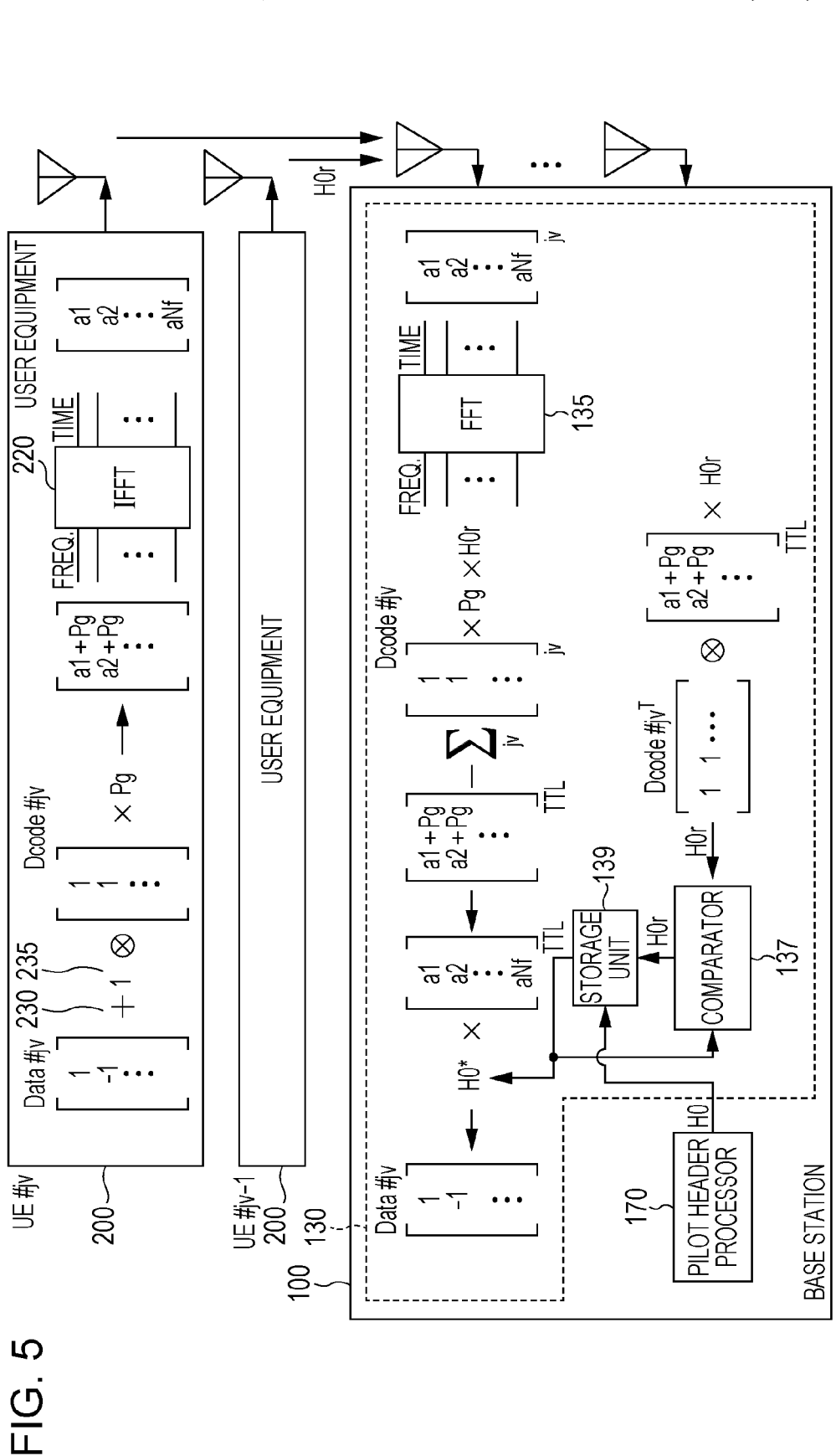
FIG. 5 is a diagram illustrating the configuration of a transmission unit in user equipment and the configurations of units for performing receiving processing and data processing in a base station according to a second embodiment of the present disclosure.

A second embodiment in which frequency domain processing is performed will be described with reference to FIG. 5. This exemplary case is substantially the same as the exemplary case illustrated in FIG. 1 in which time domain processing is performed. The difference between them is that, in a piece of user equipment, the superimposition of a pilot is performed in a frequency domain before inverse fast Fourier transform (IFFT) is performed and then the conversion into a time-domain signal is performed by the IFFT 220. In a base station, first, the FET 135 converts a received signal into a frequency-domain signal. Subsequently, in a frequency domain, the subtraction of a pilot, correlation processing, data demodulation, and channel estimation are performed.

FIG. 6 is a graph illustrating a result of characteristic simulation according to an embodiment of the present disclosure. In this example, the number of pieces of user equipment is 3, the number of antennas of a base station is 100, the type of modulation is quadraphase shift keying (QPSK), and an FET size is 512. An amplitude adjustment factor Pg is set to 1.0, and the description of this value will be described later. Since a high speed is not required in uplink transmission from user equipment, it is considered that QPSK is generally used. FIG. 6 illustrates the effect of channel estimation performed with a pilot superimposed on data. A horizontal axis represents a deviation from a channel estimated with a pilot header which is caused by Doppler effect, and a vertical axis represents the change in bit error rate (BER) with the deviation. The term of "w/o correction" indicates that there is no channel update. When a channel error exceeds 30%, BER markedly increases. This indicates that the massive MIMO channel diagonalization is inadequate. A case in which update is performed with a pilot superimposed on data is represented by the term of "w/ correction" in the drawing. In spite of the fact that a channel error increases, the BER is maintained at a low constant value. The reason why an error-free result is not obtained is that the interference of other pieces of user equipment cannot be completely eliminated even if correlation processing is performed.

Figure 7B:
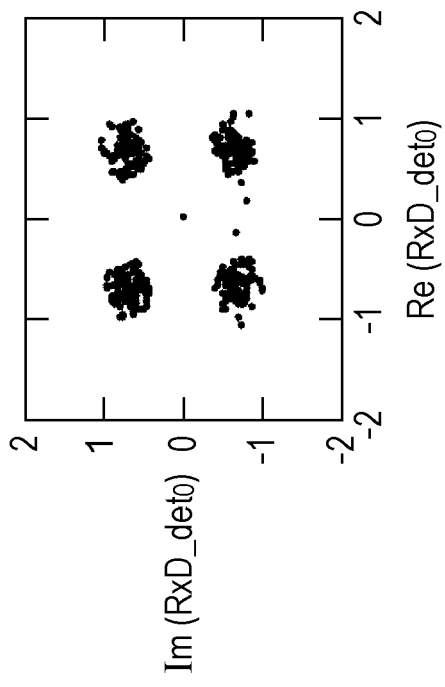
FIGS. 7A and 7B are diagrams illustrating a situation in which the constellation of received signals rotated because of Doppler effect is recovered after a channel estimation update has been performed with a pilot superimposed on data.
Figure 7A:
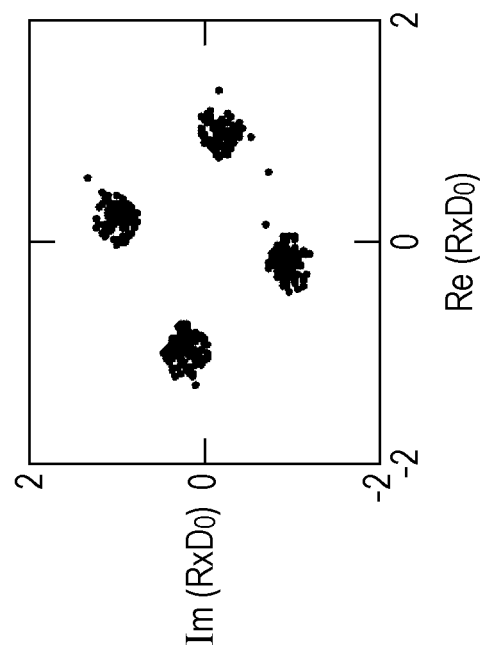

FIGS. 7A and 7B are diagrams illustrating a situation in which the constellation of received signals rotated because of Doppler effect is recovered after a channel estimation update has been performed with a pilot superimposed on data. FIG. 7A illustrates the constellation when a channel error is 100%. Referring to the drawing, the constellation is rotated. FIG. 7B illustrates the constellation when the update is performed. As is apparent from the drawing, the constellation is recovered.

Figure 8:
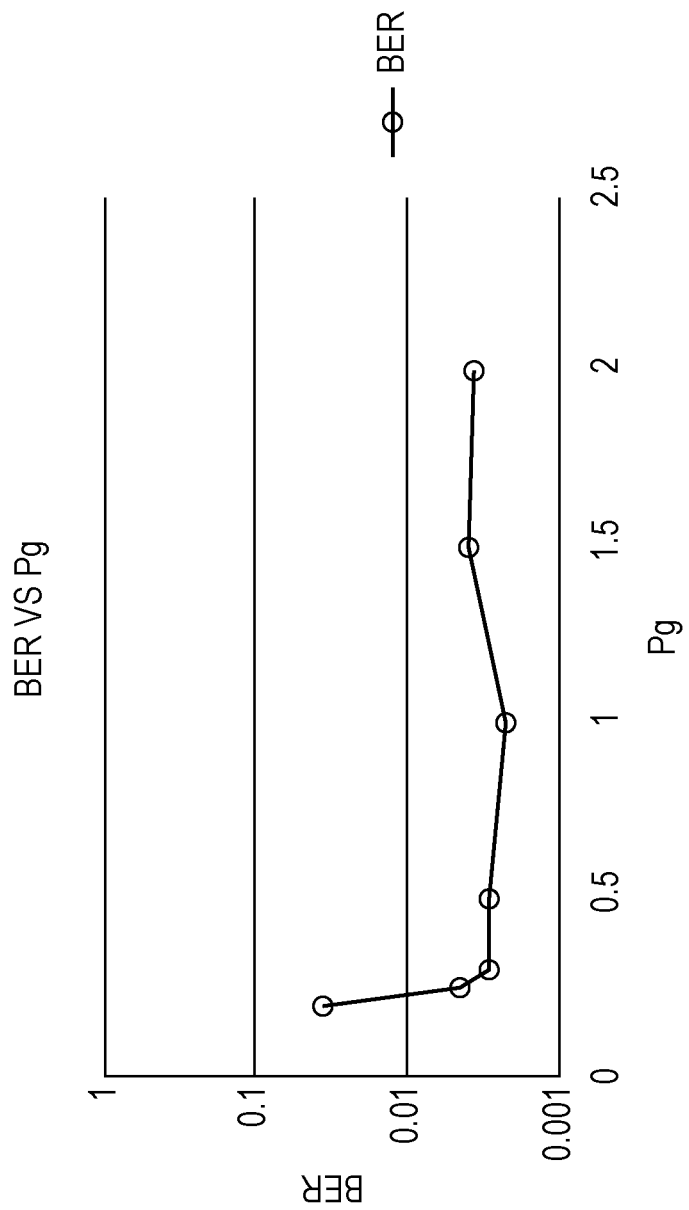
FIG. 8 is a graph illustrating a simulation result of the effect of an amplitude adjustment factor Pg according to an embodiment of the present disclosure.
Figure 9:
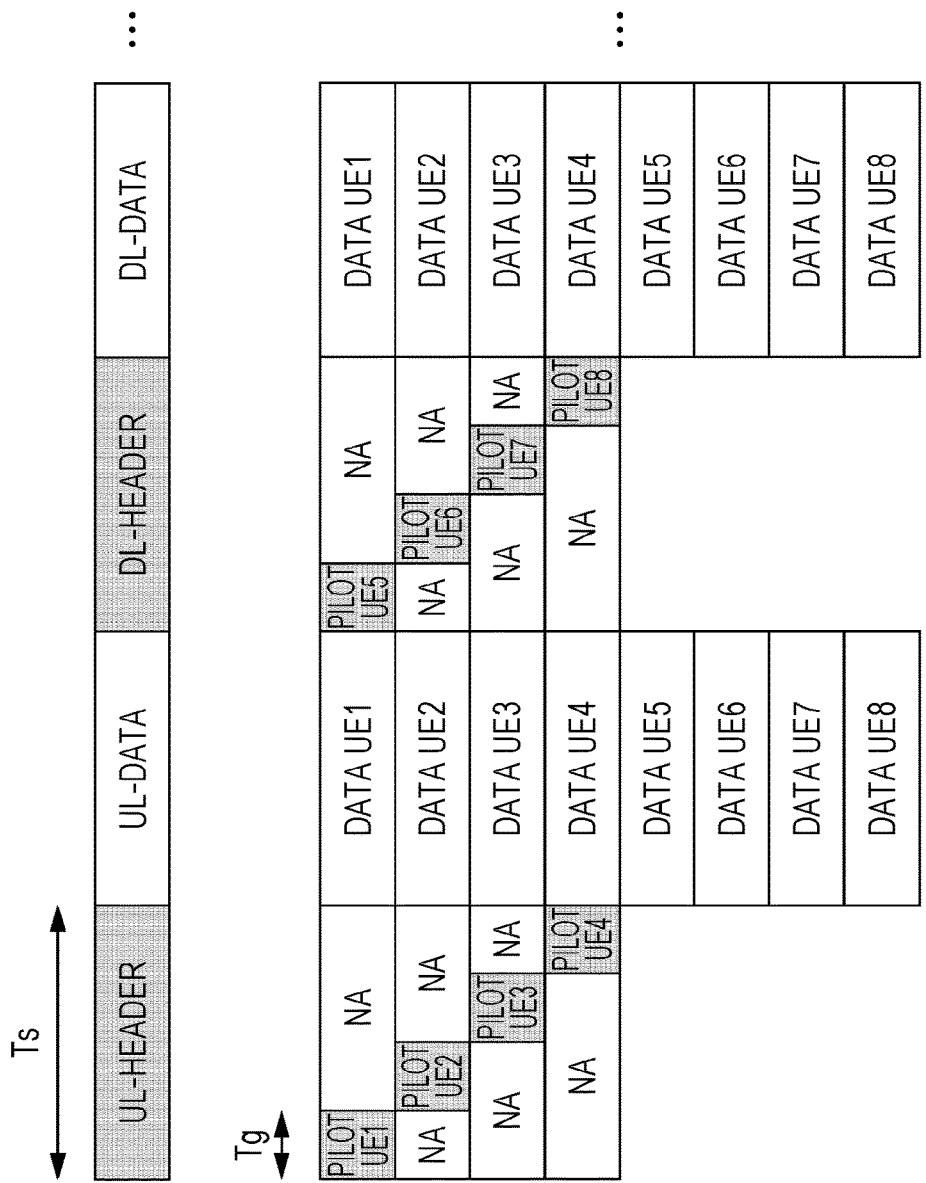
FIG. 9 is a diagram describing a known method of transmitting pilots from terminals for the purpose of channel estimation.
Figure 10:
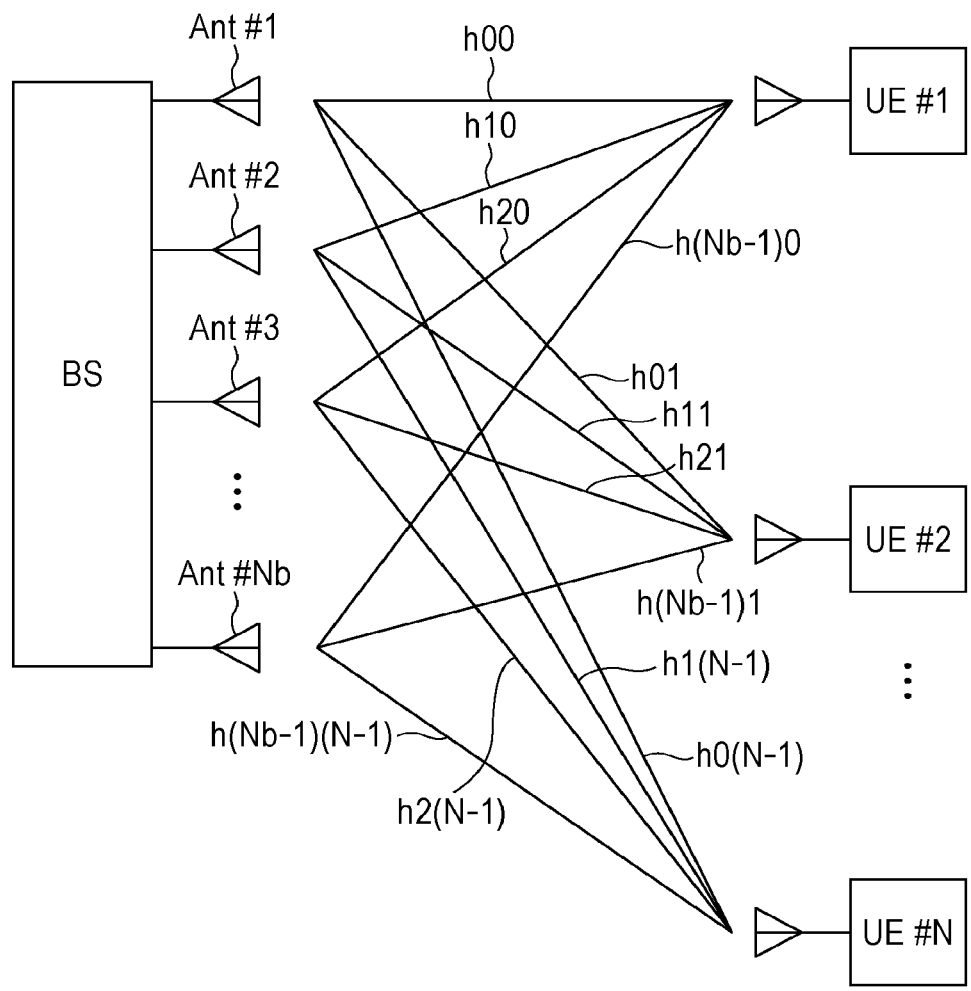
FIG. 10 is a diagram illustrating an exemplary massive MIMO configuration.

FIG. 8 illustrates a simulation result of the effect of the amplitude adjustment factor Pg. This simulation is performed under the same conditions as those described with reference to FIG. 6. The amplitude adjustment factor Pg serves as an index for determining when to separate a pilot from data. When the value of this factor is small, a pilot value becomes inaccurate because of the interference of data. When the value of this factor is large, transmission power increases. Referring to this drawing, a constant BER value is obtained when Pg>0.3. Since a pilot in data is obtained by despreading a data orthogonal code, the pilot is multiplied by a factor of the data orthogonal code. In this example, since a code having the length of 512 is used, the pilot is multiplied by 512. As is apparent from this drawing, the interference of data markedly decreases after Pg exceeds a certain value.

The present disclosure can also be applied to a communication system other than the massive MIMO communication system in which channel estimation is required. For example, in the case of a pilot signal to be used in MIMO performed in CDMA, by performing code spreading of a channel estimation signal, data, and a pilot and multiplexing them, the effect of the present disclosure can be obtained.

According to an embodiment of the present disclosure, by preparing headers for pilot transmission and headers for the other purposes in uplink and placing the pilot headers at regular intervals, the load of pilot transmission can be reduced. Furthermore, by multiplexing data and a pilot signal and embedding the pilot signal in data, a base station can perform channel estimation at the time of data reception and can always obtain the latest channel information.

The separation among a plurality of pieces of user equipment is performed with orthogonal codes. Consequently, signals from terminals in close vicinity of one another can be separated. Furthermore, since signals from the other cells can be separated, pilot contamination can be solved. In the present disclosure, since a long-period orthogonal code can be used, a code shortage does not occur.

According to the present disclosure, the following method and the following apparatuses are provided.

(1) A MIMO communication method of performing MIMO communication between a base station having a plurality of antennas and each of a plurality of terminals covered by the base station using uplink data slots and downlink data slots that are alternately placed on a time axis, comprising:
  in each of the plurality of terminals,
  setting pilot transmission headers to be used for transmission of a pilot signal at predetermined header intervals as headers of the uplink data slots;
  spreading the pilot signal in the pilot transmission headers using corresponding one of orthogonal codes that are assigned to the plurality of terminals and are orthogonal to one another and transmitting the spread pilot signal;
  spreading the pilot signal in the uplink data slots using a data orthogonal code that is different from the orthogonal code used in the pilot transmission headers, superimposing the spread pilot signal on transmission data, and transmitting the transmission data;
  in the base station,
  despreading a received signal that is transmitted from each of the plurality of terminals and is included in the pilot transmission headers using the orthogonal code assigned to the terminal, estimating a channel between each of all antennas of the base station and the terminal, and storing a value of the estimated channel;
  demodulating the transmission data transmitted from the terminal on the basis of the value of the estimated channel;
  decoding a received signal included in the uplink data slots using the data orthogonal code assigned to the terminal and estimating a current channel between each of all antennas of the base station and the terminal; and
  comparing the stored value of the estimated channel with a value of the estimated current channel and updating the stored value of the estimated channel to the value of the estimated current channel when a difference between them is larger than a value set in advance.

(2) The MIMO communication method according to (1), comprising:
  in each of the plurality of terminals,
  adjusting an amplitude of the pilot signal;
  additively superimposing the amplitude-adjusted pilot signal on the transmission data in a time direction or a frequency direction;
  transmitting a signal obtained from the superimposition;
  in the base station,
  receiving a signal transmitted from the terminal; and
  subtracting the amplitude-adjusted pilot signal from the received signal in the time direction or the frequency direction and performing demodulation for MIMO communication using a remaining signal.

(3) The MIMO communication method according to (1), wherein the uplink data slot is separated into a plurality of data sections and the pilot signal is superimposed on at least one of the plurality of data sections.

(4) The MIMO communication method according to (3), wherein the data sections are orthogonal frequency division multiplexing (OFDM) symbols.

(5) The MIMO communication method according to (4), wherein a frequency component in the OFDM symbol is separated into a plurality of blocks and the pilot signal is superimposed on each of the blocks.

(6) The MIMO communication method according to (1), wherein OFDM is used for data communication,
  wherein each of the plurality of terminals performs, in a frequency domain, the superimposition of the pilot signal on the transmission data in the uplink data slots before performing inverse fast Fourier transform (IFFT) of OFDM, and wherein the base station performs fast Fourier transform (FFT) on the received signal so as to convert the received signal into a frequency-domain signal and performs the subtraction, the demodulation, and the channel estimation in the frequency domain.

(7) A terminal for performing MIMO communication with a base station apparatus having a plurality of antennas, the terminal comprising:

a transmission unit configured to transmit data to the base station apparatus using uplink data slots, and wherein the transmission unit sets pilot transmission headers to be used for transmission of a pilot signal at predetermined header intervals as headers of the uplink data slots, wherein the transmission unit spreads the pilot signal in the pilot transmission headers using corresponding one of orthogonal codes that are assigned to a plurality of terminals and are orthogonal to one another and transmits the spread pilot signal, and wherein the transmission unit spreads the pilot signal in the uplink data slots using a data orthogonal code that is different from the orthogonal code used in the pilot transmission headers, superimposes the spread pilot signal on transmission data, and transmits the transmission data.

(8) A base station apparatus for performing MIMO communication with a plurality of terminals covered by the base station apparatus comprising:

a pilot transmission header processing unit configured to despread a signal that is received from each of the plurality of terminals via a plurality of antennas and is included in pilot transmission headers using an orthogonal code assigned to the terminal, estimate a channel between each of all of the plurality of antennas of the base station and the terminal, and store a value of the estimated channel; and a data processing unit configured to process the signal received from each of the plurality of terminals, and wherein the data processing unit demodulates transmission data transmitted from the terminal on the basis of the value of the estimated channel, wherein the data processing unit decodes a received signal included in the uplink data slots using a data orthogonal code assigned to the terminal and estimates a current channel between each of all of the plurality of antennas of the base station and the terminal, and wherein the data processing unit compares the stored value of the estimated channel with a value of the estimated current channel and updates the stored value of the estimated channel to the value of the estimated current channel when a difference between the values is larger than a value set in advance.

Although the preferred embodiments of the present disclosure have been described above, various modifications and various changes other than those described above can be made. That is, it is obvious to those skilled in the art that various changes, various combinations, other embodiments can be made in consideration of design or another factor insofar as they are within the scope of the present disclosure as claimed or the equivalents thereof.

REFERENCE SIGNS LIST

100: base station
130: data processor
135: FFT
137: comparator
200: user equipment (terminal)
220: IFFT

What is claimed is:

1. A MIMO communication method of performing MIMO communication between a base station having a plurality of antennas and each of a plurality of terminals covered by the base station using uplink data slots and downlink data slots that are alternately placed on a time axis, comprising:

in each of the plurality of terminals,
setting pilot transmission headers to be used for transmission of a pilot signal at predetermined header intervals as headers of the uplink data slots;
spreading the pilot signal in the pilot transmission headers using corresponding one of orthogonal codes that are assigned to the plurality of terminals and are orthogonal to one another and transmitting the spread pilot signal;
spreading the pilot signal in the uplink data slots using a data orthogonal code that is different from the orthogonal code used in the pilot transmission headers, superimposing the spread pilot signal on transmission data, and transmitting the transmission data;

in the base station,
despreading a received signal that is transmitted from each of the plurality of terminals and is included in the pilot transmission headers using the orthogonal code assigned to a respective one of the terminals, estimating a channel between each of all antennas of the base station and the respective terminal, and storing a first value of the estimated channel;
demodulating the transmission data transmitted from the respective terminal on a basis of the first value of the estimated channel;
decoding a received signal included in the uplink data slots using the data orthogonal code assigned to the respective terminal and estimating a current channel between each of all antennas of the base station and the respective terminal; and
comparing the stored first value of the estimated channel with a second value of the estimated current channel and updating the stored first value of the estimated channel to the second value of the estimated current channel when a difference between the values is larger than a third value set in advance.

2. The MIMO communication method according to claim 1, further comprising:
in each of the plurality of terminals,
adjusting an amplitude of the pilot signal;
additively superimposing the amplitude-adjusted pilot signal on the transmission data in a time direction or a frequency direction; and
transmitting a signal obtained from the superimposition;
in the base station,
receiving a signal transmitted from the respective terminal; and
subtracting the amplitude-adjusted pilot signal from the received signal in the time direction or the frequency direction and performing demodulation for MIMO communication using a remaining signal.

3. The MIMO communication method according to claim 1, wherein the uplink data slot is separated into a plurality of data sections and the pilot signal is superimposed on at least one of the plurality of data sections.

4. The MIMO communication method according to claim 3, wherein the data sections are orthogonal frequency division multiplexing (OFDM) symbols.

5. The MIMO communication method according to claim 4, wherein a frequency component in the OFDM symbol is separated into a plurality of blocks and the pilot signal is superimposed on each of the plurality of blocks.

6. The MIMO communication method according to claim 1,
wherein OFDM is used for data communication,
wherein each of the plurality of terminals performs, in a frequency domain, the superimposition of the pilot signal on the transmission data in the uplink data slots before performing inverse fast Fourier transform (IFFT) of OFDM, and
wherein the base station performs fast Fourier transform (FFT) on the received signal so as to convert the received signal into a frequency-domain signal and performs the subtraction, the demodulation, and the channel estimation in the frequency domain.

7. A terminal for performing MIMO communication with a base station apparatus having a plurality of antennas, the terminal comprising:
a transmitter configured to transmit data to the base station apparatus using uplink data slots and transmit pilot transmission headers to the base station using time slots separate from the uplink data slots; and
processing circuitry configured to
set the pilot transmission headers to be used for transmission of a pilot signal at predetermined header intervals as headers of the uplink data slots,
spread the pilot signal in one of the pilot transmission headers using corresponding one of orthogonal codes that are assigned to a plurality of terminals and are orthogonal to one another and transmit the spread pilot signal, wherein the pilot signals for all of the plurality of terminals are spread to overlap in time within a same time slot of the pilot transmission header,
wherein the processing circuitry is configured to spread the pilot signal in one of the uplink data slots using a data orthogonal code that is different from the orthogonal code used in the pilot transmission headers, and multiplex the spread pilot signal on transmission data, and
the transmitter is configured to transmit the transmission data in the one of the uplink data slots, wherein the transmission data for all of the plurality of terminals overlap in time within the one of the uplink data slots.

8. A base station apparatus for performing MIMO communication with a plurality of terminals covered by the base station apparatus comprising:
a plurality of antennas; and
processing circuitry configured to
despread a signal that is received from each of the plurality of terminals via the plurality of antennas and is included in pilot transmission headers using an orthogonal code assigned to a respective one of the terminals,
estimate a channel between each of all of the plurality of antennas of the base station and the respective terminal,
store a first value of the estimated channel,
process the signal received from each of the plurality of terminals,
demodulate transmission data transmitted from the respective terminal on a basis of the first value of the estimated channel,
decode a received signal included in the uplink data slots using a data orthogonal code assigned to the respective terminal and estimate a current channel between each of all of the plurality of antennas of the base station and the respective terminal, and
compare the stored first value of the estimated channel with a second value of the estimated current channel and updates the stored first value of the estimated channel to the second value of the estimated current channel when a difference between the values is larger than a third value set in advance.

* * * * *